Figure 1:
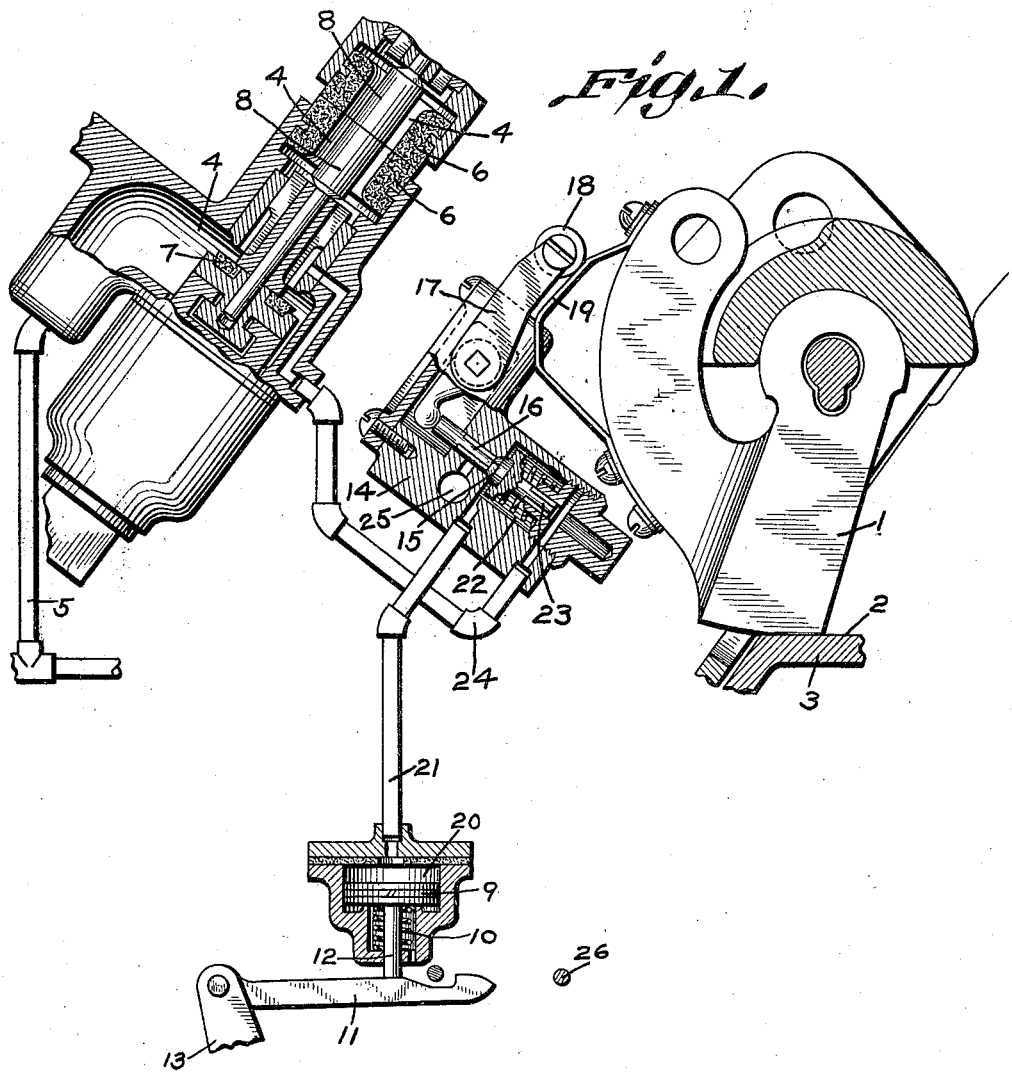

Sept. 28, 1926.

T. H. THOMAS 1,601,151

ELECTRIC COUPLER INTERLOCK

Filed July 26, 1921    2 Sheets-Sheet 1

INVENTOR
THOMAS H. THOMAS
BY *Wm. M. Cady*
ATTORNEY

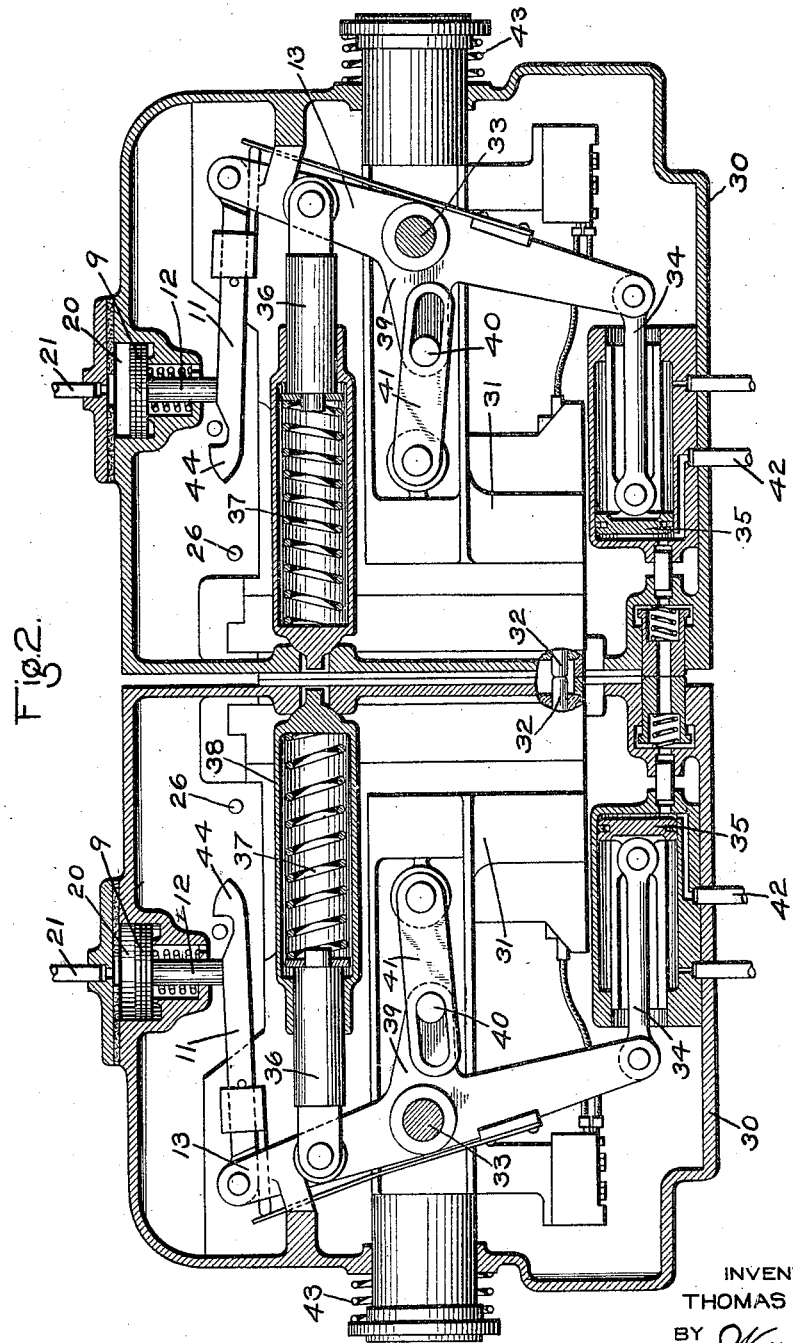

Patented Sept. 28, 1926.

1,601,151

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTRIC COUPLER INTERLOCK.

Application filed July 26, 1921. Serial No. 487,770.

This invention relates to car, air, and electric couplers, and more particularly to an interlock between the car and air coupler and the electric coupler.

Tight lock car and air couplers, of the character disclosed in the prior patent of George Westinghouse, No. 708,747, dated September 9, 1902, have a relative lateral as well as longitudinal movement when counterpart coupler heads engage in the act of coupling and where an electric train wire coupler is associated with the car and air coupler, the electric contacts should not engage until the car and air coupler heads are in the fully coupled position, as otherwise breakage or damage to the electric contacts is liable to occur, by reason of the relative lateral movement of the car and air coupler in the act of coupling.

The principal object of my invention is to provide an interlock mechanism for ensuring that the car and air coupler heads will be in the full coupled position before the electric contacts can be projected into engagement with the corresponding contacts of a counterpart electric coupler head.

In the accompanying drawing, Figure 1 is a diagrammatic view, in section, of portions of a car and air coupler with my invention applied thereto; and Fig. 2 a horizontal section of counterpart electric train line couplers in the coupled position.

In the drawing, only so much of the car and air coupler is shown as is deemed necessary to illustrate the application and operation of my invention, reference being had to the Westinghouse patent, hereinbefore mentioned, for a full description of the tight lock coupler.

In this type of coupler, a pivoted locking lever 1 is provided which is adapted to bear against a surface 2 of a projection 3 of a counterpart coupler head to hold the couplers securely clamped together when in the coupled position.

In the car and air coupler are passages for establishing communication through the coupling for the train pipe lines, such as the passage 4, which is connected with the brake pipe 5, the outlet opening of the passage being provided with a gasket 6 adapted to engage a corresponding gasket of a counterpart coupler in the coupled position. A valve 7 controls communication through the passage 4 and said valve is operated to open communication by the engagement of a tappet 8, attached to the valve, with a corresponding tappet in a counterpart coupler.

In order to illustrate one application of my invention, I have shown the tripping portion of an electric train line coupler such as covered by the pending application of H. F. Woernley, Serial No. 474,061, filed June 1, 1921, and comprising a piston 9, subject on one side to the pressure of a spring 10 and operated by fluid pressure supplied to the opposite side for tripping a locking arm 11, through the engagement therewith of a piston stem 12. When the arm 11 is tripped, a lever 13 is released and this permits the electric contacts of the electric coupler to be projected into engagement with corresponding contacts of a counterpart electric coupler head.

The electric coupler construction above referred to is shown in Fig. 2 of the drawings and comprises a casing 30, adapted to be secured to the car coupler, and containing a movable slide 31 carrying a plurality of contacts 32, which are adapted to engage corresponding contacts of a counterpart coupler, when the couplers are brought together and the slides 31 are projected outwardly.

Pivotally mounted in the casing 30 on a pin 33, is a lever 13, having one end thereof connected by a rod 34 to a piston 35 and having pivotally connected thereto at a point near the other end of the lever, a plunger 36, which engages the end of a coil spring 37, so that upon movement of the piston 35, by fluid under pressure, the lever 13 is rocked on the pin 33, to cause the plunger 36 to compress the spring 37. Said spring is mounted in a casing 38, the outer end of which engages a bearing in the casing 30.

The lever 13 is provided with an arm 39 carrying a pin 40 adapted to engage in an elongated slot of a link 41, which link is pivotally connected to the slide 31.

Assuming the couplers to be in the coupled position, as shown in Fig. 2, in order to uncouple, fluid under pressure is supplied through pipe 42 to piston 35 and said piston is then shifted rearwardly, rocking the lever 13, and thereby causing the plunger 36 to compress spring 38. At the same time, the pin 40 is retracted, permitting the slide 31 to be moved rearwardly by the release spring 43.

The above described movement of lever 13 also projects the arm 11, so that the hook 44 engages pin 26 and thereby locks the parts in the uncoupled position, with spring 37 compressed.

According to my invention, the interlock mechanism may comprise a casing 14, adapted to be secured to the body portion of the car and air coupler, and containing valve 15, having a fluted valve stem 16 adapted to engage one end of a pivoted lever 17. The opposite end of the lever 17 is provided with a roller 18 adapted to engage the surface of a cam member 19 which is secured to the locking lever 1.

Piston chamber 20 of the piston 9 is connected by a pipe 21 with valve chamber 22 and a fluted stem 23, associated and movable with the valve 15, controls communication from valve chamber 22 to a pipe 24, leading to passage 4 at a point intermediate the valve 7 and the gasket 6.

In operation, when the car and air couplers are brought together for coupling, the locking lever 1 is pushed back by engagement with the projection 3 of the counterpart coupler head and in this movement the cam member 19 acts through the roller 18 to rock the lever 17 and thereby cause the other end of the lever to engage and depress the valve stem 16 so as to open the valve 15.

In the act of coupling, the tappets 8 engage and open the valves 7, so that fluid under pressure is free to pass through the passage 4 from one coupler to the other. Fluid under pressure is then admitted to pipe 24, but although the valve 15 is now open, it will be noted that communication through the flutes of the valve stem 23 is cut off and only such fluid as may leak past the solid portion of the stem 23 can flow from pipe 24 to valve chamber 22. Any leakage of fluid past the solid portion of the stem 23 will escape past the open valve 15 at the exhaust port 25 and possible building up of pressure on piston 9 at this time is thus prevented. The leakage of fluid past the solid portion of the stem 23 is so slight that there is no possible danger of causing a material reduction in brake pipe pressure.

When the car and air couplers reach their fully coupled positions, the locking lever 1 moves back so as to engage the locking face 2 of the projection 3 of the counterpart coupler head and thereby hold the coupler heads securely locked together in the usual manner. At the same time, the cam member 19 is moved to the position shown in the drawing, permitting the lever 17 to move so that the valve 15 is allowed to seat. As soon as the valve 15 seats, fluid under pressure is supplied from pipe 24 to pipe 21 and thence to piston chamber 20. The piston 9 is thereupon operated by fluid under pressure, causing the stem 12 to engage and trip the arm 11 from engagement with the pin 26. The stored up energy in spring 37 then acts on lever 13 to project slide 31 and the electric contacts 32 into engagement with the corresponding contacts of a counterpart electric coupler head.

In addition to providing for the exhaust of fluid leaking past the stem 23 in the act of coupling, the valve 15 also operates to release fluid under pressure from the piston 9 when cars are uncoupled, since the movement of the latch 1 from its locking position, causes the cam 19 to operate the lever 17 so as to open the valve 15 and thus vent fluid from piston 9 to exhaust port 25.

When the car and air coupler is in the uncoupled position, the valve 7 is closed and the piston chamber 20 is connected to the atmosphere by way of valve chamber 22, pipe 24 and passage 4, which is open to the atmosphere at the gasket 6.

The cam member 19 is so designed that the valve 15 cannot fully close until the locking lever 1 has substantially assumed the fully coupled position, as shown in the drawing, so that the electric contacts cannot be projected until the coupler heads are in the full coupled position.

Having now described my invention, what I claim as new and desire to secure by Letters Patent, is:—

1. The combination with a coupler having a movable latch operated upon the coming together of counterpart couplers for locking said couplers in engagement, of an electric coupler locking device, a piston operated by fluid under pressure for releasing said device, a valve operated by said latch for releasing fluid from said piston, valve means also operated by said latch for controlling communication from a passage to said piston, and a valve opened upon the coming together of counterpart couplers for supplying fluid under pressure to said passage.

2. The combination with a coupler having a movable latch operated upon the coming together of counterpart couplers for locking said couplers in engagement, of an electric coupler locking device, a piston operated by fluid under pressure for releasing said device, a valve operated by said latch for releasing fluid from said piston, valve means associated with said valve for controlling communication from a passage to said piston, a valve opened upon the coming together of counterpart couplers for supplying fluid under pressure to said passage, said passage being connected to the atmosphere when the coupler is free from engagement with a counterpart coupler.

3. The combination with a coupler having a movable latch operated upon the coming together of counterpart couplers for locking said couplers in engagement, of an electric train line coupler locking device, a piston operated by fluid under pressure for releasing said device, means for supplying fluid under pressure to a passage as counterpart couplers are brought into engagement, valve means operated upon movement of said latch to its locking position for connecting said passage to said piston, and a valve opened by said latch upon movement from its locking position for releasing fluid from said piston.

4. The combination with a coupler having a movable latch operated upon the coming together of counterpart couplers for locking said couplers in engagement, of an electric train line coupler locking device, a piston operated by fluid under pressure for releasing said device, means for supplying fluid under pressure to a passage as counterpart couplers are brought into engagement, and valve means operated upon movement of said latch to its locking position for connecting said passage to said piston and upon movement from its locking position for releasing fluid from said piston and at the same time restricting the flow of fluid under pressure to said piston.

5. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, and valve means controlled by said latch and operated only upon movement of said latch to its fully locked position for supplying fluid under pressure to said piston.

6. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, a valve for controlling communication through which fluid under pressure is supplied to said piston, and means operated by the movement of said latch away from its locking position for operating said valve to close said communication.

7. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, a valve for controlling communication through which fluid under pressure is supplied to said piston, means operated by the movement of said latch away from its locking position for operating said valve to close said communication, and a spring for operating said valve to open said communication upon movement of said latch substantially to its fully locked position.

8. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, a valve operated upon the coming together of counterpart couplers for supplying fluid under pressure to a passage, valve means for controlling communication from said passage to said piston, and means for operating said valve means to open said communication upon movement of said latch substantially to its fully locked position.

9. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, valve means for controlling communication from a fluid pressure supply passage to a chamber communicating with said piston, a valve for controlling communication from said chamber to the atmosphere, and means controlled by the movement of said latch for controlling the operation of said valve means and said valve.

10. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, valve means for controlling communication from a fluid pressure supply passage to a chamber communicating with said piston, a valve for controlling communication from said chamber to the atmosphere, and means controlled by the movement of said latch for controlling the operation of said valve means and said valve whereby said valve means closes communication from said passage to said chamber and said valve opens communication from said chamber to the atmosphere when said latch is away from its fully locked position.

11. The combination with a coupler having a movable latch operated upon the coming together of counterpart couplers for locking said couplers in engagement, of an electric train line coupler locking device for restraining the projection of the electric coupler, a piston operated by fluid under pressure for releasing said locking device, whereby the electric coupler is projected, valve means for controlling communication from a fluid pressure supply passage to a chamber communicating with said piston, a valve for controlling communication from said chamber to the atmosphere, and means controlled by the movement of said latch for controlling the operation of said valve means and said valve whereby said valve means opens communication from said passage to said chamber and said valve closes communication from said chamber to the atmosphere when said latch is moved substantially to its fully closed position.

12. The combination with a coupler having a movable latch operated upon the coming together of counterpart couplers for locking said couplers in engagement, of valve means for controlling communication from a fluid pressure supply passage to a chamber having an outlet passage, a valve movable with said valve means for controlling communication from said chamber to the atmosphere, a lever for operating said valve and valve means, and a cam operated by said latch for operating said lever.

In testimony whereof I have hereunto set my hand.

THOMAS H. THOMAS.